UNITED STATES PATENT OFFICE.

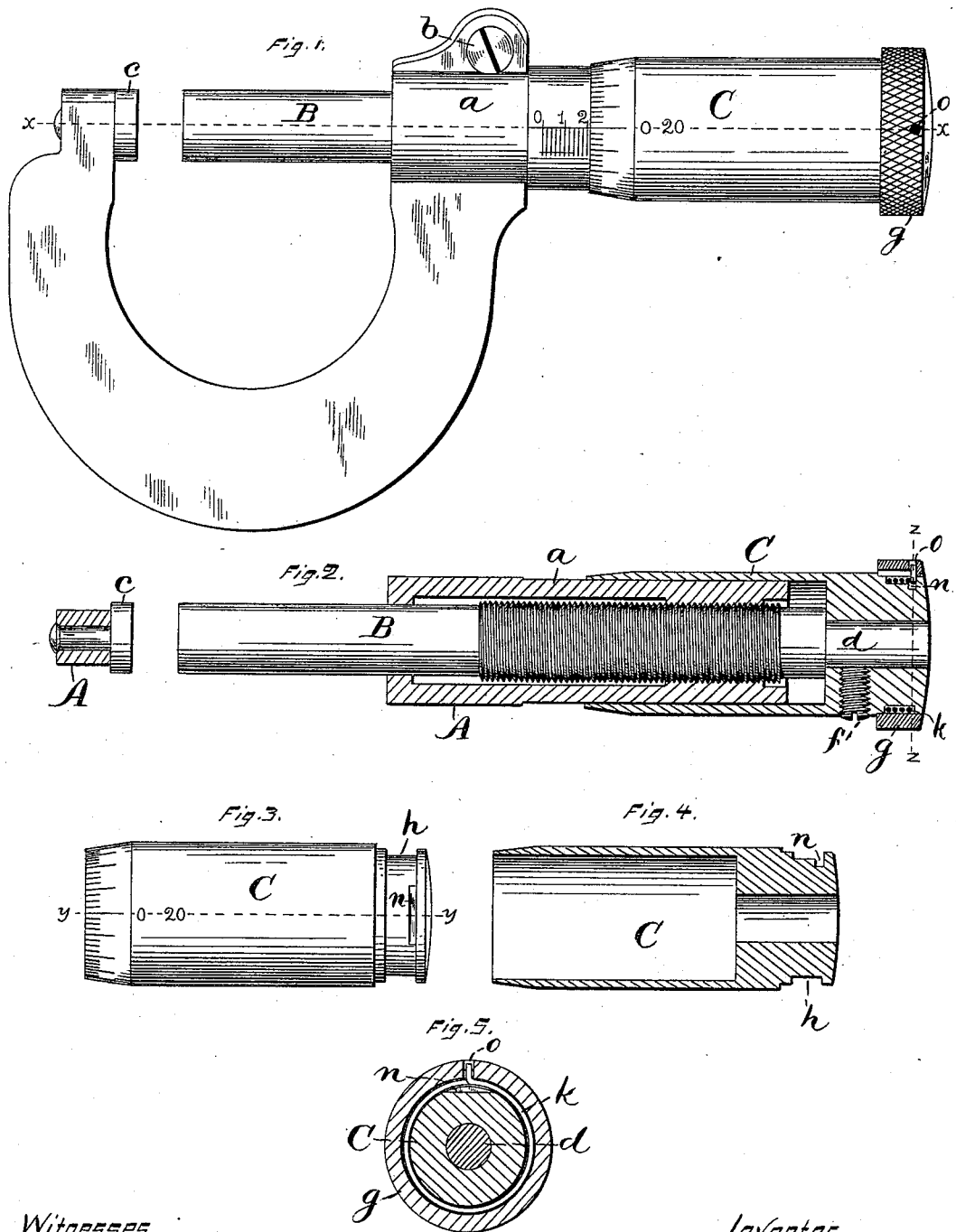

ALBERT L. WASHBURN, OF BOSTON, MASSACHUSETTS, ASSIGNOR TO WILLIAM H. WILKINSON, OF SAME PLACE.

MICROMETER-CALIPERS.

SPECIFICATION forming part of Letters Patent No. 350,513, dated October 12, 1886.

Application filed January 21, 1886. Serial No. 189,275. (No model.)

*To all whom it may concern:*

Be it known that I, ALBERT L. WASHBURN, a citizen of the United States, residing at Boston, in the county of Suffolk and State of Massachusetts, have invented certain new and useful Improvements in Micrometer-Calipers, of which the following is a specification.

My invention relates to that class of micrometers in which the measuring-screw acts in opposition to an anvil; and the objects of my improvement are to provide the screw itself, instead of the anvil, with proper means for adjustment to compensate for wear, and also to provide means for obtaining a uniform pressure of the screw on the object being measured.

In the accompanying drawings, which are on an enlarged scale, Figure 1 is a side elevation of my calipers. Fig. 2 is a sectional view thereof on line $x\,x$, Fig. 1, with certain parts in side elevation. Fig. 3 is a side elevation of the sleeve alone. Fig. 4 is a longitudinal section of said sleeve on line $y\,y$ of Fig 3, and Fig. 5 is a transverse section on the line $z\,z$ of Fig. 2 with the friction-spring in elevation.

A designates the frame of the instrument, having a split nut, $a$, and clamp screw $b$ at one end and an anvil at the other. The nut $a$ is made quite long and its outer end is of a cylindrical form. The measuring-screw B has a smooth threadless inner end, so that the thread of the screw is wholly covered by the nut $a$; but this feature is not of my invention. The outer end of the screw has a plain neck or shank, $d$, Figs. 2 and 5, upon which the sleeve C is secured and held in position thereon by the set-screw $f$, Fig. 2. The inner end of the sleeve surrounds the cylindrical portion of the nut.

My invention may be arranged to register in sixty-fourths of an inch, thousandths of an inch, the metric system, or other system or scale, as may be desired. As shown in the drawings, it is designed to register thousandths of an inch with a screw of fifty threads to the inch, while the sleeve is divided into twenty parts. The scale along the index-line on the side of the nut, to indicate the number of revolutions given to the sleeve, corresponds to the thread of the screw.

The instrument is so made and adjusted that when the inner end of the screw is pressed against the anvil $e$ the instrument will register zero. Heretofore adjustment to take up wear in the endwise direction of the screw has been made by adjusting the anvil. I adjust to take up such wear by changing the position of the sleeve on the screw. If by wear the sleeve shall move beyond the zero point when its end is in proper contact with the anvil, it is only necessary to loosen the sleeve on the smooth end or shank $d$ of the screw, and turn it back to zero, and then firmly refasten it to the screw by suitable fastening mechanism—as, for instance, by means of the set-screw $f$, the end of which impinges against the smooth side of the shank $d$. It is necessary that the part of the screw to which the sleeve is thus secured shall be threadless or smooth, in order that the sleeve may be partially rotated in a given position on the screw—that is, without moving it longitudinally to any appreciable extent—otherwise the end of the sleeve would not properly register with the scale by the index-line on the nut.

I will next describe the means by which I obtain a uniform pressure of the screw on the object being measured, whether the screw is turned home gently or otherwise. I slightly reduce the diameter of the outer end of the sleeve to form a shoulder, against which rests the inner edge of the knurled ring or operating-handle $g$. I form in this reduced portion of the sleeve a groove, $h$, Figs. 3 and 4, forming what I call a "grooved neck," which groove, when covered by the ring $g$, forms an annular chamber, within which chamber I place the friction-spring $k$. In the bottom of the groove $h$, I form a slight recess or transverse groove, $n$, and for convenience of locating this recess when covered by the spring $k$, I form it in line with the zero-mark. The friction-spring is simply a helix of spring wire having one end bent outwardly, as clearly shown in Fig. 5. The coils of this spring should, before it is put in place, be somewhat smaller than the diameter of the sleeve C at the groove $h$, so that when placed thereon the spring will pinch the bottom of the groove sufficiently to necessitate the revolution of the sleeve and screw with the spring for turning the screw inward.

The ring $g$ has a groove part way through it on the inside, (see Fig. 2,) at the end of which is a radial hole, $o$.

In order to assemble the parts, the spring is placed in the groove $h$, by springing out one coil at a time, and, as it were, screwing it into place upon the grooved neck. It is then turned until the bent end is over the recess $n$, as shown in Fig. 5, when said end is pressed inwardly upon the bottom of the recess $n$, so that said end projects no farther than the bottom of the groove on the inside of the ring $g$. Said ring can then be slipped on over the spring, the bent end slipping through the groove inside the ring, relatively speaking, until it is opposite the hole $o$, when said end will spring outwardly and into said hole, as shown in Fig. 5, and thereby the ring will be held in place on the sleeve, and the spring and ring must rotate together. The spring is so coiled that when the ring is turned in the direction to turn the screw inward the pressure on the spring is exerted in the proper direction to uncoil it or loosen its coils, but when the screw is free there is friction enough between the spring and sleeve to drive the screw inward as the ring is turned. So soon as the end of the screw is pressed upon the object being measured (said object meanwhile being against the anvil) the inward movement of the screw and sleeve is arrested; but the ring may be turned farther with ease, the force then applied thereto having a tendency to unwind and loosen the coils of the spring so that it slips along with the ring while the sleeve is stationary. Thus it will be seen that no matter what force is applied to the ring, only a given and uniform pressure of the screw upon the object being measured can be given; but there is always power enough in the spring to turn the sleeve and screw outward by turning the ring, for when it is turned backward the coils wind tightly upon the bottom of the groove $h$ of the sleeve, so that the spring will not slip at all.

While there is ordinarily no necessity for removing the ring, it may be removed, when desired, by turning the ring until the hole $o$ is in line with zero on the sleeve, then holding the sleeve against rotation and turning the ring backward—that is, turning the top of the ring to the left, when the parts are in the position represented in Fig. 2. This will force the bent end of the spring down out into the recess $n$ and out of the hole $o$, so that the ring may be slipped off.

I claim as my invention—

1. In a micrometer, a frame having a nut and index, in combination with the measuring-screw fitted to turn in said nut, and having a plain portion at its outer end, the sleeve fitted to said plain portion to partially rotate in a given position thereon, and fastening mechanism to fasten the sleeve on the screw at such points as to compensate for wear, substantially as described, and for the purpose specified.

2. In a micrometer, the combination of the sleeve having a grooved neck, a friction-spring coiled about said neck, and the operating handle or ring connected by one end to said spring, while the other end of the spring is in frictional contact with the neck of the sleeve, substantially as described, and for the purpose specified.

ALBERT L. WASHBURN.

Witnesses:
SAML. JENNISON,
WALDO D. PUTNAM.